United States Patent [19]

Eppley et al.

[11] Patent Number: 5,067,269
[45] Date of Patent: Nov. 26, 1991

[54] ICE FISHING TIP-UP WITH INDICATOR LIGHT AND FLAG

[76] Inventors: David M. Eppley, 2312 8th Ave. N.; Robert L. Charpentier, 3518 3rd Ave. N., both of Great Falls, Mont. 59401

[21] Appl. No.: 645,986

[22] Filed: Jan. 24, 1991

[51] Int. Cl.⁵ .................................................. A01K 97/00
[52] U.S. Cl. ........................................................ 43/17
[58] Field of Search ............................................ 43/17

[56] References Cited

U.S. PATENT DOCUMENTS

| | | | |
|---|---|---|---|
| 2,785,493 | 3/1957 | Thiel | 43/17 |
| 2,786,294 | 3/1957 | Whitacre | 43/17 |
| 3,078,610 | 2/1963 | Howell | 43/17 |
| 3,352,048 | 11/1967 | Fleming | 43/17 |
| 4,633,608 | 1/1987 | Savarino | 43/17 |
| 4,707,932 | 11/1987 | Sonnemaker | 43/17 |
| 4,928,419 | 5/1990 | Forrestal | 43/17 |
| 4,980,986 | 1/1991 | Harper | 43/17 |
| 4,996,788 | 3/1991 | Wieting et al. | 43/17 |

Primary Examiner—Richard K. Seidel
Assistant Examiner—Edward A. Brown

[57] ABSTRACT

A bias coil spring loaded ice fishing tip-up assembly having an indicator light consisting of a light bulb, two strand lead wires, a non conductive collar with a metal plate attached, a conductive collar and a battery clip. This assembly is attached to a movable strike indicator which, when activated by a trigger will cause the completion of a circuit, lighting the bulb intermittently at first, then becoming a steady source of light, signaling a fish strike.

1 Claim, 4 Drawing Sheets

ICE FISHING TIP-UP WITH INDICATOR LIGHT AND FLAG

BACKGROUND—FIELD OF INVENTION

The present invention relates to lighted signaling systems for bias coil spring loaded ice fishing tip-ups.

BACKGROUND—DESCRIPTION OF PRIOR ART

The present invention relates generally to signaling systems for ice fishing devices, and in particular, to a lighting device designed to be merchandised in the form of an accessory for use with an ice fishing tip-up. Still further, the invention deals with an improved tip-up assembly for use in ice fishing. The assembly includes a much improved light means as well as a fish strike indicator.

A number of light signaling devices have been proposed and some are actually used on ice fishing tip-ups for the primary purpose of enhancing the signaling of a fish strike to the user. As is common in ice fishing, a single user may have a number of fishing lines in an equal number of ice holes. Frequently, ice fishing occurs at dusk or dark and conventional signaling devices, such as flags, which are part of the known type of tip-up, are inadaquate to clearly advise the user of a strike. The conventional tip-up includes a base, typically in the form of a board or runners of sufficient length so as to span the ice fishing hole. A fishing line, with hook attached, suspends from a reel mounted on the board and operatively connected with the line so as to activate a flag to pop up in the case a fish takes the hook and exerts sufficient pressure on the line. For use during low light, dusk or night time hours, a light in some suitable form is operated when the visual signaling flag device releases and springs to an upright position.

Known types of lighting devices for tip-ups include a number of disadvantages. For practical purpose, most light devices weigh well in excess of half a pound, are cumbersome and single directional. Being single directional requires the user to be near his tip-ups in sometimes very adverse weather during low light or dark periods and they do give off an eye catching intermittent flash before coming completely on. They can also be difficult to see at even short distances. Some lighting devices must be removed for use in removing a fish from the hook and for rebaiting and resetting of the hook and tip-up.

Sometimes the fishing line itself is used to interrupt the circuit of the light device so as to prevent operation of the light until a strike occurs of sufficient force to dislodge the fishing line from the source which places further resistance on the fishing line which in turn must be overcome by a striking fish and that resistance may interfere with the successful hooking of a fish. Other known lighting devices contain elements that are affected by extreme temperatures and components that are subject to icing conditions or breakage that make them ineffectual during low light or dark periods. There are also lighting devices that must be attached to their power source on a very permanent basis, thus, any time a strike is made by a fish and the indicator flag is activated, the lighting device drains its power source during times when the strike indicator light is not needed during the daylight hours. Consequently, the utility of the tip-up is limited and expensive as daylight fisherman have no need to purchase additional equipment necessary to illuminate the known tip-up. In summation, without a separately packaged combination of the necessary elements described not being availabe, it leaves the need for ready adaptation of the known conventional tip-up for low light or no light conditions, unfilled.

SUMMARY OF INVENTION—OBJECTIVES AND ADVANTAGES

The lighting device is easily attached to a bias coil spring portion of the known tip-up. The device may be detached but this is not necessary due to its nature of being lightweight, uncombersome and unobtrusive. The light device is omnidirectional and can be seen as it blinks intermittently while the flag wavers before coming into a constant upright position. The light source then becomes a constant source of light that is bright enough to be seen from several hundred yards as well as having the ability to be used to perform certain tasks such as unhooking the caught fish, rebaiting the hook and resetting of the visual signaling device. It can also be readily detached from its power source so as not to drain that power source during daylight hours.

DRAWING FIGURES

FIG. 1 shows a perspective view of the basic version of the bias coil spring loaded ice fishing tip-up light device. It contains bulb 17 connected to a double strand wire 18. A portion of that double strand wire 19 is connected to a non conductive collar 21 which is attached to it a metal plate 22. This acts as the switch 22. A portion of the double strand wire 20 is connected to a conductive collar 23. The end of the double strand wire 18 is connected to a battery clip 24.

DESCRIPTION OF THE PREFERRED EMBODIMENT

Figure 2:
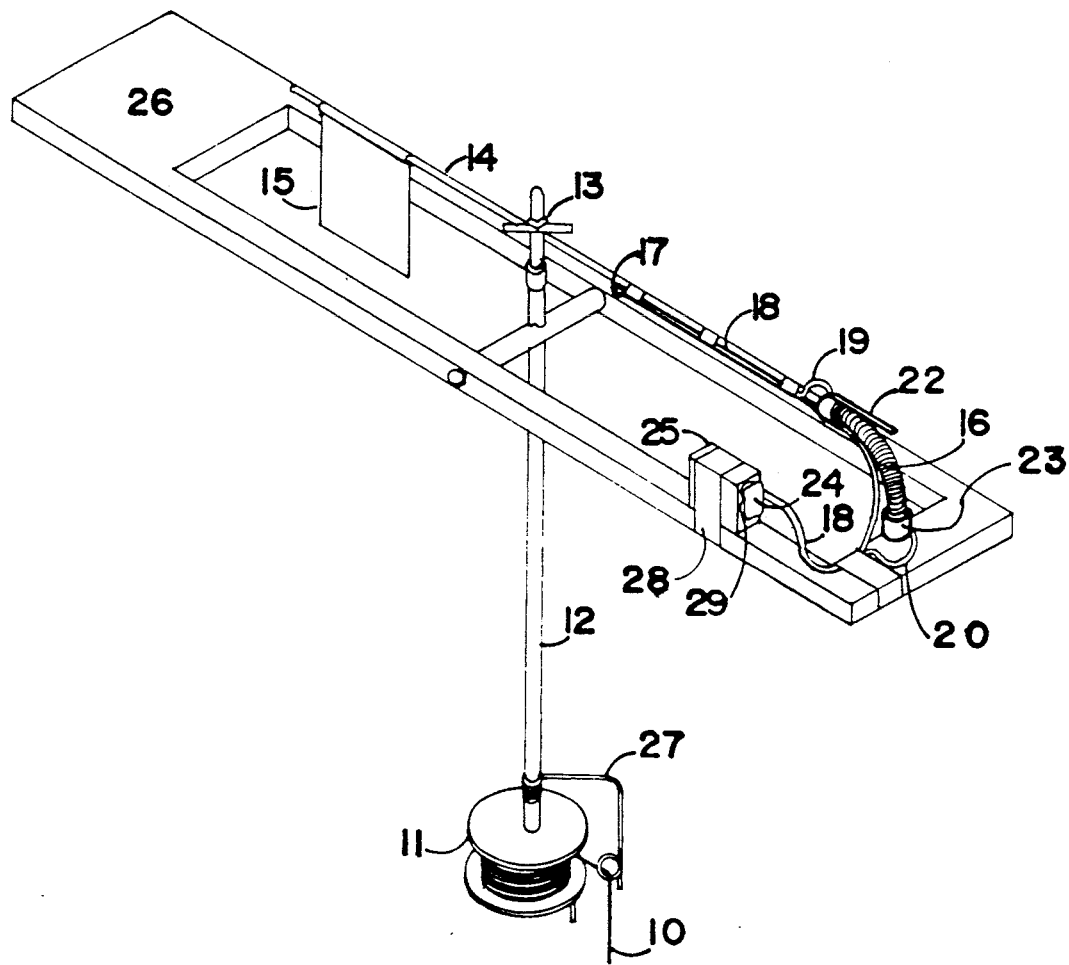
FIG. 2 shows a commonly used bias coil spring loaded ice fishing tip-up with the present invention propery mounted.

FIG. 2 illustrates a well known form of ice fishing tip-up which is improved by the addition of the combination of elements of the subject invention. The basic tip-up 26 is of the type fully disclosed in the U.S. Pat. No. 2,654,176, issued Oct. 6, 1953, the disclosure of which is hereby incorporated by reference.

The tip-up 26 includes a base in the form of a wooden, metal or high strength material in the shape of a board or runners of sufficient length to span or bridge a drilled or chopped hole in the ice. Centrally located on the base is a trigger 13/reel 11 combination assembly, shown in FIGS. 2, 3 and 4. This trigger/reel combination extends through base 26 with the trigger mechanism 13 located above the base 26 and the reel 11 and associated parts located well below the base. This assembly includes a trigger shaft bearing tube 12 that extends vertically through the base and houses a rotatable trigger shaft. The lower end of shaft 12 has a reel 11 mounted thereon, the reel around which is wound a fishing line 10 suitably stored on reel 11 in the conventional manner.

When a strike occurs as a result of a fish taking the hook at the end of the fishing line 10, initial tension on that line results in the rotation of the arm 27 through which the fishing line 10 is threaded, into the direction of the strike so that line 10 is paid off radially from reel 11. As pressure from the stike is continued, reel 11 rotates to supply additional line 10. This causes the trigger shaft to rotate, which in turn rotates the trigger 13 far enough to release the flag staff 14, bringing the flag 15 into an upright stationary position after wavering several times.

Figure 3:
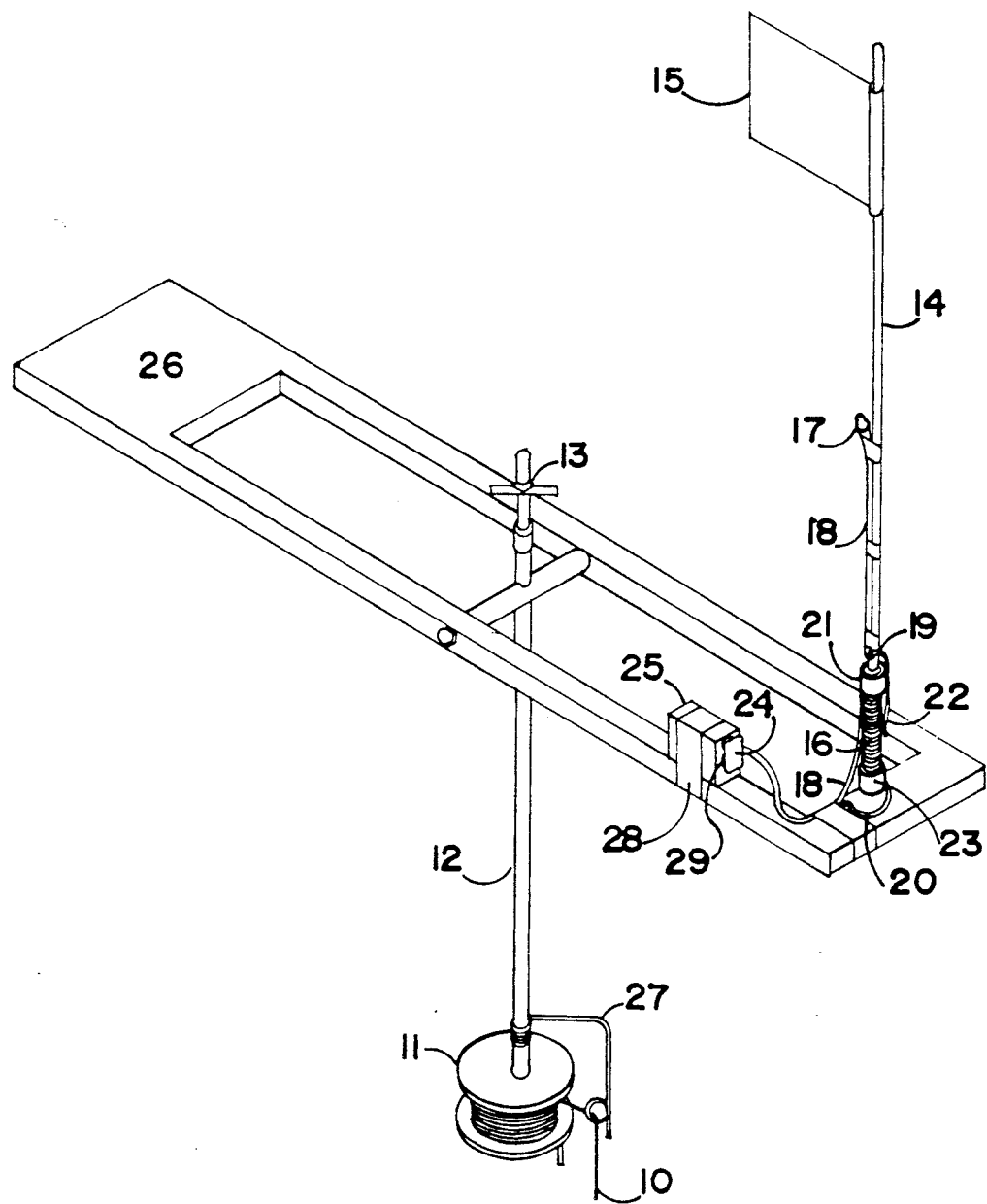
FIG. 3 shows a commonly used bias coil spring loaded ice fishing tip-up with the present invention in its full operating position.
Figure 4:
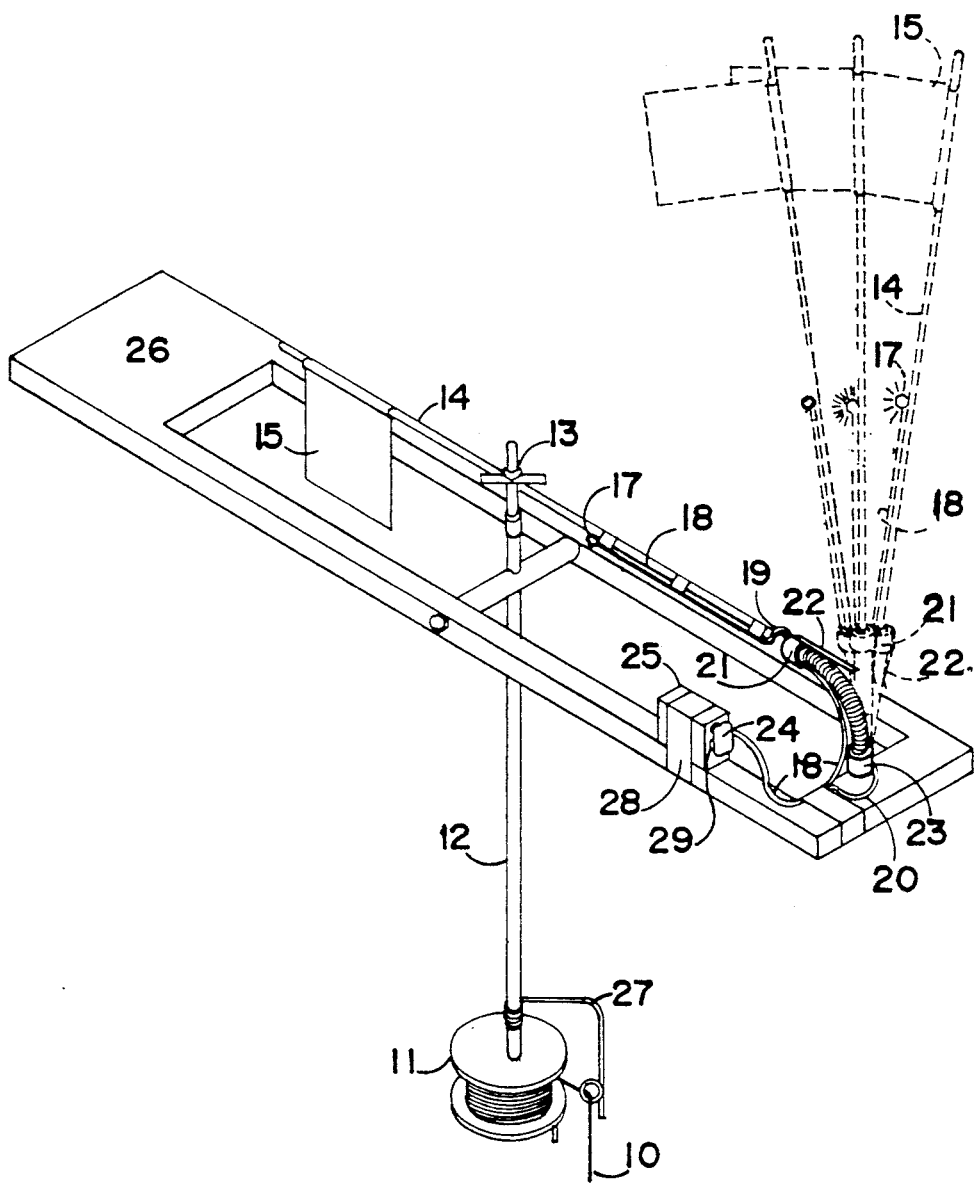
FIG. 4 shows a commonly used bias coil spring loaded ice fishing tip-up with the present invention operatively mounted there on and showing, in phantom the intermittent characteristics of the present invention before it settles into a steady source of light.

As shown in FIGS. 2, 3 and 4, flag staff 14 forms a part of a bias coil spring 16 suitably fixed at its base to the tip-up 26 and is readily bendable to permit generally horizontal positioning of flag staff 14 for engagement with trigger 13. The free end of flag staff 14 includes flag 15. When the flag staff is released, spring 16 will cause the staff 14 and flag 15 to move to an upright position after wavering several times as shown in phantom in FIG. 4.

Figure 1:
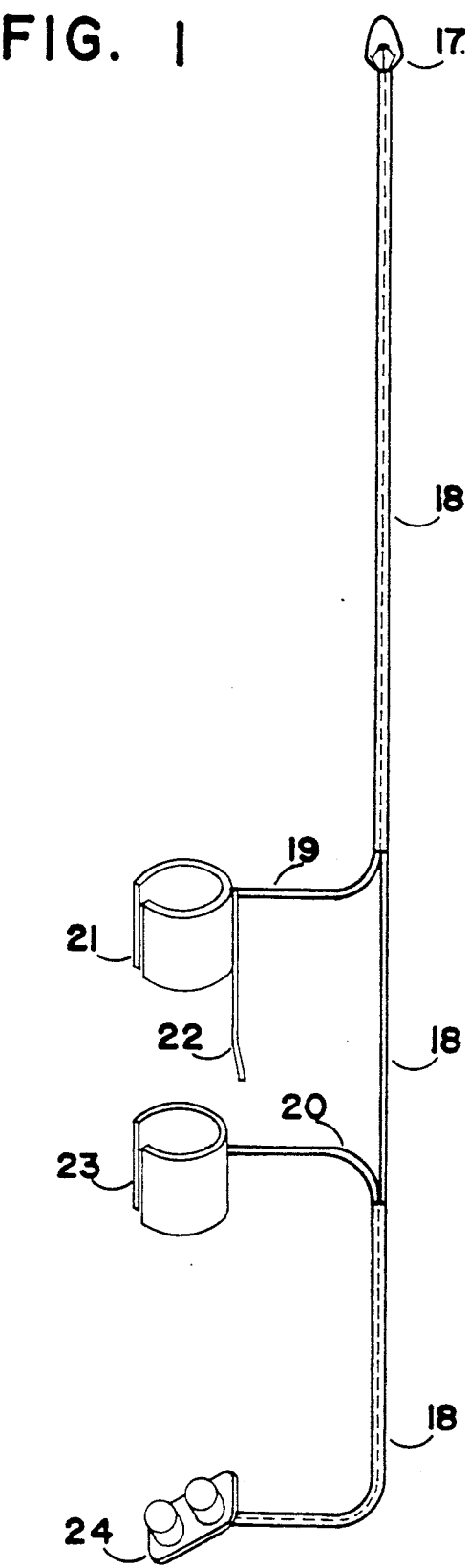

The effective utilization of the above briefly described type of tip-up is greatly enhanced by the provision of the lighting device shown separately in FIG. 1 and mounted in position as shown in FIGS. 2, 3 and 4. The lighting device in FIG. 1 is mounted by sliding conductive collar 23 and the non conductive collar 21 with metal plate 22 on to the flag staff 14 and over the bias coil spring 16 in such a manner that when the flag 15 and flag staff 14 are in the process of coming to an upright position, metal plate 22 makes intermittent contact with the bias coil spring 16. With battery clip 24 connected to battery 25, the metal plate 22 coming into contact with bias coil spring 16, completes the electrical circuit, causing light 17 to glow constantly as the flag comes to its stationary upright position.

The power source, battery 25, is joined to the tip-up 26 and wiring 18 to flag staff 14.

As previously described, the improvements of the present invention are not permanent parts of a tip-up but then also do not have to be removed in order to utilize the tip-up in the event that night time fishing is not contemplated at a given moment. To preserve the power source during other than low light hours or hours of darkness, the light device is deactivated by simply removing battery clip 24 from battery 25.

The positioning of the light source 17 is also of significance. Once a strike has occurred, the light is in such a position and of such intensity so as to enable the user to see while reeling in the catch and removing the catch from the hook. This same source can be used for baiting the hook and rewinding the line 10 on the reel 11. These tasks can be performed without removing the light source.

While a particular embodiment of the invention has been shown and described, it will be obvious to those skilled in the art that changes and modifications may be made therein without departing from the invention in its broader aspects and, therefore the aim in the appended claims is to cover all such changes and modifications as fall within the true spirit and scope of the invention.

We claim:

1. A tip-up for use in ice fishing, said tip-up comprising:

a horizontal base to be placed across a hole in an ice surface, a fishing line supply means depending from said base for Ser. No. 07/645,986 (Eppley, Charpentier) Amndmnt A, contd. insertion in said hole in said ice surface;

trigger means on said base and operatively engageable with said fishing line supply means to be operated in response to a strike on said line;

moveable signal means adjoined to said base by a bias coil spring, said signal means having operative vertical and inoperative horizontal positions and being engageable with said trigger means to hold said signal means in its inoperative position in the absence of said fish strike on said line, said visual signal means being in the form of a flag and a staff mounted on said base by said bias coil spring and moveable by actuation of said trigger means from said inoperative position to an operative upright vertical position;

a lighting device connected to said moveable signal means and to said bias coil spring comprising;

a bulb connected to wiring, said wiring in turn is connected to two collars, one of which is a nonconductive collar with a metal plate and one of which is a conductive collar that is inserted into said base, said collars and bulb connected to a power source by way of said wiring, said metal plate completes an electrical circuit when it plate comes into contact with said bias coil spring when the visual signaling device flag staff comes into a stationary upright position.

* * * * *